US011942249B2

(12) United States Patent
Tanada

(10) Patent No.: US 11,942,249 B2
(45) **Date of Patent: *Mar. 26, 2024**

(54) COMPOSITE MAGNETIC PARTICLE INCLUDING METAL MAGNETIC PARTICLE

(71) Applicant: TAIYO YUDEN CO., LTD., Tokyo (JP)

(72) Inventor: Atsushi Tanada, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,796

(22) Filed: Nov. 30, 2022

(65) Prior Publication Data

US 2023/0187110 A1 Jun. 15, 2023

Related U.S. Application Data

(63) Continuation of application No. 16/831,288, filed on Mar. 26, 2020, now Pat. No. 11,538,612.

(30) Foreign Application Priority Data

Mar. 28, 2019 (JP) ................................ 2019-062218

(51) Int. Cl.
*H01F 17/04* (2006.01)
*B22F 1/052* (2022.01)
(Continued)

(52) U.S. Cl.
CPC .............. *H01F 17/04* (2013.01); *B22F 1/052* (2022.01); *B22F 1/102* (2022.01); *B22F 1/17* (2022.01);
(Continued)

(58) Field of Classification Search
None
See application file for complete search history.

(56) References Cited

U.S. PATENT DOCUMENTS 11,538,612 B2 * 12/2022 Tanada ...................... B22F 3/14
2005/0074600 A1 4/2005 Ma
(Continued)

FOREIGN PATENT DOCUMENTS

JP 2010-034102 A 2/2010
JP 2018-041955 A 3/2018
(Continued)

OTHER PUBLICATIONS

Screen shot (included in Office Action) of https://www.sciencedirect.com/topics/chemistry/softening-point#:~:text=The%20resins%20are%20non%2Dcrystalline,hardness%20and%20brittleness%20of%20resins. (Year: 2002).*
(Continued)

*Primary Examiner* — Kevin M Bernatz
(74) *Attorney, Agent, or Firm* — Pillsbury Winthrop Shaw Pittman, LLP

(57) ABSTRACT

A composite magnetic body according to one aspect of the present invention includes a first metal magnetic particle covered with a first resin portion made of a first resin material and a second metal magnetic particle having a smaller particle size than the first metal magnetic particle, where the second metal magnetic particle is bound to the first metal magnetic particle via a second resin portion made of a second resin material, the second resin material having a softening point higher than the first resin material.

15 Claims, 11 Drawing Sheets

(51) Int. Cl.

| | |
|---|---|
| ***B22F 1/102*** | (2022.01) |
| ***B22F 1/17*** | (2022.01) |
| ***H01F 1/153*** | (2006.01) |
| ***H01F 1/24*** | (2006.01) |
| ***H01F 1/26*** | (2006.01) |
| ***H01F 1/33*** | (2006.01) |
| ***H01F 27/255*** | (2006.01) |
| *B22F 1/10* | (2022.01) |

(52) U.S. Cl.

CPC ........... *H01F 1/15375* (2013.01); *H01F 1/24* (2013.01); *H01F 1/26* (2013.01); *H01F 1/33* (2013.01); *H01F 27/255* (2013.01); *B22F 1/10* (2022.01); *H01F 2017/048* (2013.01); *Y10T 428/32* (2015.01)

(56) References Cited

U.S. PATENT DOCUMENTS

| | | | | |
|---|---|---|---|---|
| 2006/0105170 | A1 | 5/2006 | Dobson | |
| 2014/0138569 | A1* | 5/2014 | Otsuka | H01F 1/26 252/62.51 R |
| 2016/0086717 | A1 | 3/2016 | Harada | |
| 2017/0297096 | A1* | 10/2017 | Harano | H01F 1/26 |
| 2019/0221340 | A1* | 7/2019 | Iwata | H01F 1/15366 |
| 2019/0267170 | A1* | 8/2019 | Nakamura | B22F 1/16 |
| 2019/0333666 | A1* | 10/2019 | Nakamura | H01F 1/24 |
| 2020/0035391 | A1 | 1/2020 | Suetsuna | |
| 2020/0082963 | A1 | 3/2020 | Suetsuna | |
| 2021/0280347 | A1* | 9/2021 | Nakamura | H01F 1/24 |
| 2021/0305651 | A1* | 9/2021 | You | H01M 10/0481 |
| 2022/0072606 | A1 | 3/2022 | Suetsuna | |

FOREIGN PATENT DOCUMENTS

| | | | | |
|---|---|---|---|---|
| WO | 2010/084812 | A1 | 7/2010 | |
| WO | WO-2010084812 | A1 * | 7/2010 | B22F 1/0062 |
| WO | WO-2012146967 | A1 * | 11/2012 | B22F 1/02 |

OTHER PUBLICATIONS

Notice of Reasons for Refusal dated Feb. 7, 2023, issued in corresponding Japanese Patent Application No. 2019-062218 with English translation (8 pgs.).

Decision of Refusal dated Aug. 8, 2023, issued in corresponding Japanese Patent Application No. 2019-062218, with English translation (7 pgs.).

* cited by examiner

COMPOSITE MAGNETIC PARTICLE INCLUDING METAL MAGNETIC PARTICLE

CROSS-REFERENCE TO RELATED APPLICATIONS

This application is a continuation of U.S. patent application Ser. No. 16/831,288 (filed on Mar. 26, 2020), issued on Dec. 27, 2022 under U.S. Pat. No. 11,538,612 B2, which claims the benefit of priority from Japanese Patent Application Serial No. 2019-062218 (filed on Mar. 28, 2019), the contents of which are hereby incorporated by reference in their entirety.

TECHNICAL FIELD

The disclosure herein relates to a composite magnetic particle including a metal magnetic particle, an electronic component including a magnetic base body formed by such composite magnetic particles and a method of manufacturing these.

BACKGROUND

Various magnetic materials have been conventionally used in electronic components such as inductors. An inductor typically includes a magnetic base body made of a magnetic material, a coil conductor embedded in the magnetic base body, and an external electrode connected to an end of the coil conductor.

The magnetic base body used in the electronic components is made of composite magnetic particles, in which metal magnetic particles have an insulating film made of a resin formed on the surface thereof. The magnetic base body of this type is produced by, for example, making a slurry by mixing and kneading composite magnetic particles and a binder, pouring the slurry into a mold, and applying pressure to the slurry in the mold.

Magnetic base bodies for electronic components such as inductors are required to have a high magnetic permeability. Efforts have been made to improve the magnetic permeability of the magnetic base bodies. For example, Japanese Patent Application Publication No. 2018-041955 (“the ’955 Publication”) discloses a composite magnetic particle including a core power made of a magnetic material and a resin layer covering the surface of the core powder. The resin layer is a single layer made of a macromolecular material and thus serves as an insulator, a binder and a hardener. According to the disclosure of the ’955 Publication, the resin layer is in direct contact with the core powder, which allows any magnetic materials to be used to form the core powder. The ’955 Publication claims that an inductor with a high magnetic permeability can be consequently provided.

The ’955 Publication also discloses that a magnetic base body can be formed using two or more types of magnetic particles having different average particle sizes. This can raise the magnetic particle filling rate (filling density) in the magnetic base body and accordingly improve the magnetic permeability of the magnetic base body. Japanese Patent Application Publication No. 2010-034102 also discloses that two or more types of metal magnetic particles having different average particle sizes may be mixed together to increase the magnetic particle filling rate (filling density) in the magnetic base body.

A composite magnetic particle including a metal magnetic particle and a resin film provided on the surface of the metal magnetic particle can be produced using the mixing and kneading provided by various types of mills such as a bead mill and a ball mill. To be more specific, the mill’s mixing and kneading can mix metal magnetic particles and a resin composition, so that metal magnetic particles having a resin film provided on the surface thereof are produced. However, when two or more types of metal magnetic particles having different particle sizes are mixed with a resin composition, the resin composition serves as a primer to disadvantageously cause the metal magnetic particles having a smaller particle size to be aggregated easily.

If composite magnetic particles including aggregated smaller-particle-size metal magnetic particles are used to produce a magnetic base body, the metal magnetic particles are unevenly distributed in the magnetic base body. More specifically, the metal magnetic particles having a smaller particle size are locally concentrated in a certain portion within the magnetic base body. Consequently, in the remaining portion within the magnetic base body, the metal magnetic particles having a larger particle size accounts for a higher ratio.

Here, the magnetic flux generated as a result of the application of current to the coil preferentially selects and travels along the path in which the metal magnetic particles having a larger particle size accounts for a high ratio. Therefore, if the metal magnetic particles having a smaller particle size are aggregated in the magnetic base body, the magnetic flux is distributed unevenly in the magnetic base body. For this reason, as the DC current running through the coil conductor of the above-mentioned coil component increases, magnetic saturation occurs sequentially from a magnetic path with a higher proportion of the metal magnetic particles having a large average particle size among a plurality of magnetic paths of the magnetic flux passing through the magnetic base body.

As described above, if the magnetic base body formed by the composite magnetic particles including aggregated small-particle-size metal magnetic particles is used to form the coil component including the coil, uneven distribution of magnetic flux in the magnetic base body causes local magnetic saturation. Accordingly, as the DC current applied to the coil increases, the inductance gradually falls. For this reason, it is difficult to achieve increased allowable current for the coil component including the magnetic base body that is formed using composite magnetic particles including aggregated small-particle-size metal magnetic particles.

When metal magnetic particles are aggregated, adjacent metal magnetic particles can more easily establish electrical contact with each other. If adjacent metal magnetic particles establish electrical contact with each other, those metal magnetic particles form a single particle having a large particle size from the electromagnetic perspective. When metal particles are placed in varying magnetic field, the likelihood of large eddy current increases as the particle size of the metal particles increases. Therefore, if the magnetic base body formed using the composite magnetic particles including aggregated small-particle-size metal magnetic particles is used for the coil component, the eddy current loss disadvantageously increases.

SUMMARY

An object of the present invention is to solve or relieve at least a part of the above problem. One specific object of the invention is to provide composite magnetic particles including less aggregation of metal magnetic particles. Another object of the invention is to provide an electronic component including a magnetic base body formed using composite magnetic particles including less aggregation of metal magnetic particles. A further object of the invention is to provide a method of manufacturing the composite magnetic particle and the electronic component. Other objects of the present invention will be made apparent through description in the entire specification.

A composite magnetic particle according to one aspect of the present invention includes a first metal magnetic particle covered with a first resin portion made of a first resin material, and a second metal magnetic particle having a smaller particle size than the first metal magnetic particle, where the second metal magnetic particle is bound to the first metal magnetic particle via a second resin portion made of a second resin material, and the second resin material has a larger molecular weight than the first resin material.

The entire surface of the first metal magnetic particle may be covered with the first resin portion.

A magnetic base body according to one aspect of the present invention includes the above-described composite magnetic particle.

A magnetic base body according to one aspect of the present invention includes a plurality of first metal magnetic particles each covered with a first resin portion made of a first resin material, and a plurality of second metal magnetic particles having a second average particle size smaller than a first average particle size, where the first average particle size is an average particle size of the plurality of first metal magnetic particles. Each of the second metal magnetic particles is covered with a second resin portion made of a second resin material and bound to at least one of the first metal magnetic particles via at least one selected from the group consisting of the first resin portion and the second resin portion. In a case where a cross-section of the magnetic base body is measured using a scanning electron microscope (SEM) with a magnification ratio of 2000, pairs of adjacent ones of the first metal magnetic particles are observed and 15% or less of the pairs have no second metal magnetic particle between the adjacent first metal magnetic particles.

An electronic component according to one aspect of the present invention includes a magnetic base body formed from the above-described composite magnetic particle. The electronic component may include a coil provided in the magnetic base body. The electronic component is, for example, an inductor.

A manufacturing method of a composite magnetic particle according to one aspect of the present invention includes a coating step of forming, on a surface of a first metal magnetic particle, a first resin portion made of a first resin material, and a binding step of binding a second metal magnetic particle having a smaller particle size than the first metal magnetic particle to the first metal magnetic particle via a second resin portion made of a second resin material, where the second resin material has a larger molecular weight than the first resin material.

The binding step may include a step of forming the second resin portion on a surface of the first resin portion, and a step of mixing together the first metal magnetic particle having the second resin portion formed thereon and the second metal magnetic particle.

The binding step may include a step of mixing together the first metal magnetic particle having the first resin portion formed thereon and the second metal magnetic particle to produce a particle mixture, and a step of mixing together the particle mixture and a resin composition made of the second resin material.

The molecular weight of the second resin material may be equal to or more than twice as large as the molecular weight of the first resin material.

The first resin portion may account for 0.01 wt % to 0.1 wt % relative to the second resin portion of 100 wt %.

Advantages

According to the disclosure of the specification, it is possible to provide composite magnetic particles including less aggregation of metal magnetic particles.

DESCRIPTION OF THE EMBODIMENTS

Figure 1:
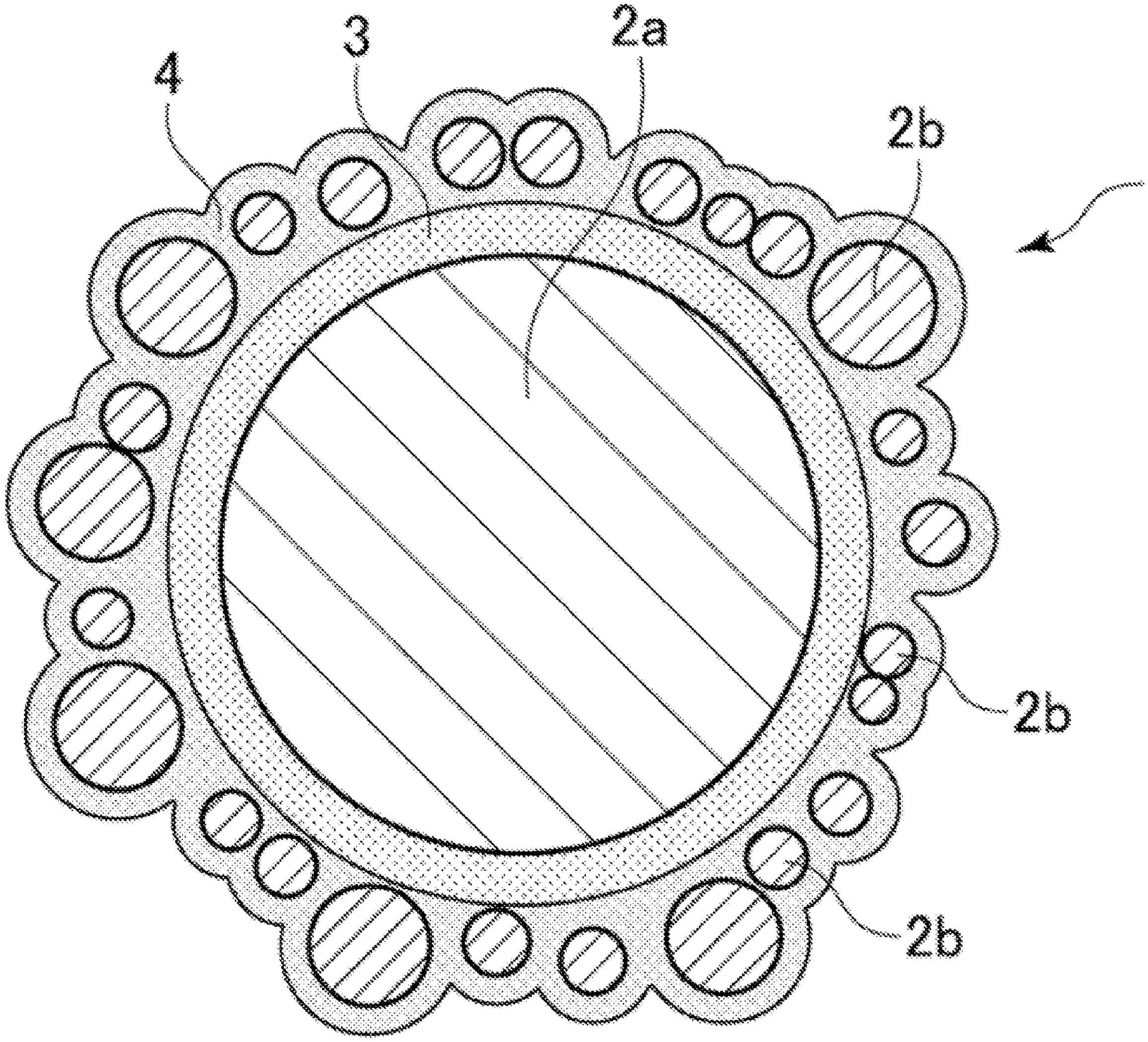
FIG. 1 schematically shows a composite magnetic particle relating to an embodiment of the present invention.

A composite magnetic particle 1 relating to one embodiment of the present invention will be described with reference to FIG. 1. The composite magnetic particle 1 can be used to make a magnetic base body of an electronic component, which will be described below. The composite magnetic particle 1 relating to the embodiment of the present invention includes a first metal magnetic particle 2*a* covered with a first resin portion 3 and a plurality of second metal magnetic particles 2*b* bound to the first metal magnetic particle 2*a* via a second resin portion 4.

According to one embodiment, the first metal magnetic particle 2*a* and the second metal magnetic particles 2*b* are of a crystalline or amorphous metal or alloy including at least one element selected from the group consisting of iron (Fe), nickel (Ni) and cobalt (Co). The metal magnetic particles may further contain at least one element selected from the group consisting of silicon (Si), chromium (Cr) and aluminum (Al). The metal magnetic particles may be pure iron particles containing Fe and unavoidable impurities, or particles of an Fe-based amorphous alloy containing iron (Fe). The Fe-based amorphous alloy includes, for example, Fe—Si alloy, Fe—Si—Al alloy, Fe—Si—Cr—B alloy, Fe—Si—B—C alloy, and Fe—Si—P—B—C alloy. To the surface of the first and second metal magnetic particles 2*a* and 2*b*, an oxide film obtained by oxidizing an alloy or metal may adhere. When the oxide film adheres to the surface of the first and second metal magnetic particles 2*a* and 2*b*, magnetic property is exhibited in the non-oxidized region within the oxide film.

The first metal magnetic particle 2*a* has a larger particle size than the second metal magnetic particles 2*b*. In one embodiment, the first metal magnetic particle 2*a* has a particle size of 5 to 100 μm and a specific surface area ratio (BET value) of 3 $m^2/g$ or less. In one embodiment, the second metal magnetic particles 2*b* have a particle size of 0.05 to 50 μm and a specific surface area ratio (BET value) of 15 $m^2/g$ or less. The first and second metal magnetic particles 2*a* and 2*b* have a spherical shape, for example. The shape of the first and second metal magnetic particles 2*a* and 2*b* is not limited to spherical and may be alternatively flake-like, for example. In the shown embodiment, the composite magnetic particle 1 includes a plurality of second metal magnetic particles 2*b*. The second metal magnetic particles 2*b* are bound, via a second resin portion 4, to the first metal magnetic particle 2*a* having the first resin portion 3 formed thereon. This reduces aggregation of the second metal magnetic particles 2*b*. Adjacent ones of the second metal magnetic particles 2*b* are preferably separated from each other. The adjacent second metal magnetic particles 2*b* may be deemed to be separated from each other when the second resin portion 4 is between the adjacent second metal magnetic particles 2*b*. Some of the second metal magnetic particles 2*b* included in the composite magnetic particle 1 may be in direct contact with their adjacent second metal magnetic particles 2*b* (without the second resin portion 4 therebetween).

In one embodiment, the first resin portion 3 has a thickness of 100 nm or less. The thickness of the first resin portion 3 depends on the particle size of the first metal magnetic particle 2*a*. In one embodiment, the first resin portion 3 provided on the surface of the first metal magnetic particle 2*a* is made of a first resin material. The first resin material is a resin having a smaller molecular weight than the second resin material of the second resin portion 4 and contains at least one selected from the group consisting of a hydrolyzable silyl group, a vinyl group, an epoxy group, an amino group and a methacryl group. The first resin material may contain Si in the molecular frame. The first resin portion 3 is preferably formed to cover the whole surface of the first metal magnetic particle 2*a*. The first resin material is preferably a resin material having a small molecular weight and flowability to such an extent that the first resin material can cover the entire surface of the first metal magnetic particle 2*a*. The molecular weight of the first resin material may be compared against the molecular weight of the second resin material in terms of the average molecular weight. When the molecular weight of the first resin material is compared against the molecular weight of the second resin material, their number-average molecular weights may be compared against each other. In this case, the first resin material has a smaller number-average molecular weight than the second resin material. When the molecular weight of the first resin material is compared against the molecular weight of the second resin material, their weight-average molecular weights may be compared against each other. In this case, the first resin material has a smaller weight-average molecular weight than the second resin material. The number- and weight-average molecular weights can be measured using HLC-8220HGPC available from Tosoh Corporation. As the analytical column, $GMH_{XL}$ and $G3000H_{XL}$ available from Tosoh Corporation can be used. The analytical column is selected in accordance with the types and molecular weights of the first and second resins, and the selected one has an optimal packing material diameter for the purposes of size elimination chromatography (SEC). The number- and weight-average molecular weights may be measured using gel permeation chromatography (GPC) and expressed in terms of polystyrene (PS).

The second resin portion 4 is formed on the external surface of the first metal magnetic particle 2*a* having the first resin portion 3 formed thereon. The second resin portion 4 is in contact with the first resin portion 3. The second resin portion 4 is formed to cover some or all of the second metal magnetic particles 2*b*. The surface of the second metal magnetic particles 2*b* may be entirely covered with the second resin portion 4. The surface of the second metal magnetic particles 2*b* may be partly covered with the second resin portion 4. The second metal magnetic particles 2*b* are bound to the first metal magnetic particle 2*a* via the second resin portion 4.

In one embodiment, the second resin portion 4 is made of a second resin material having a larger molecular weight than the first resin material. The second resin material is, for example, a resin mixture obtained by mixing together a cresol novolak epoxy resin and a phenolic resin. The cresol novolak epoxy resin has an epoxy equivalent weight of 200 to 250, a softening point of 50° C. to 100° C. and a relative density of 1.15 to 1.30, and the phenolic resin has an OH equivalent weight of 100 to 120 and a softening point of 60° C. to 110° C. The ratio of the cresol novolak epoxy resin to the phenolic resin is, for example, 1:1. The second resin material is not limited to the resin mixture obtained by mixing together a cresol novolak epoxy resin and a phenolic resin. The second resin material can be any resin material as long as it has a larger molecular weight than the first resin material. The molecular weight of the second resin material can be equal to or more than twice as large as the molecular weight of the first resin material. The softening point of the second resin material may be higher by 50° C. or more than the softening point of the first resin material.

In the composite magnetic particle 1, the first resin portion 3 accounts for 0.01 wt % to 10 wt % relative to the second resin portion 4 of 100 wt %.

When the particle size of the first metal magnetic particle 2*a* is denoted as D1 and the particle size of the second metal magnetic particle 2*b* is denoted as D2, $D1/D2 \geq 3$ may be satisfied.

Figure 2A:
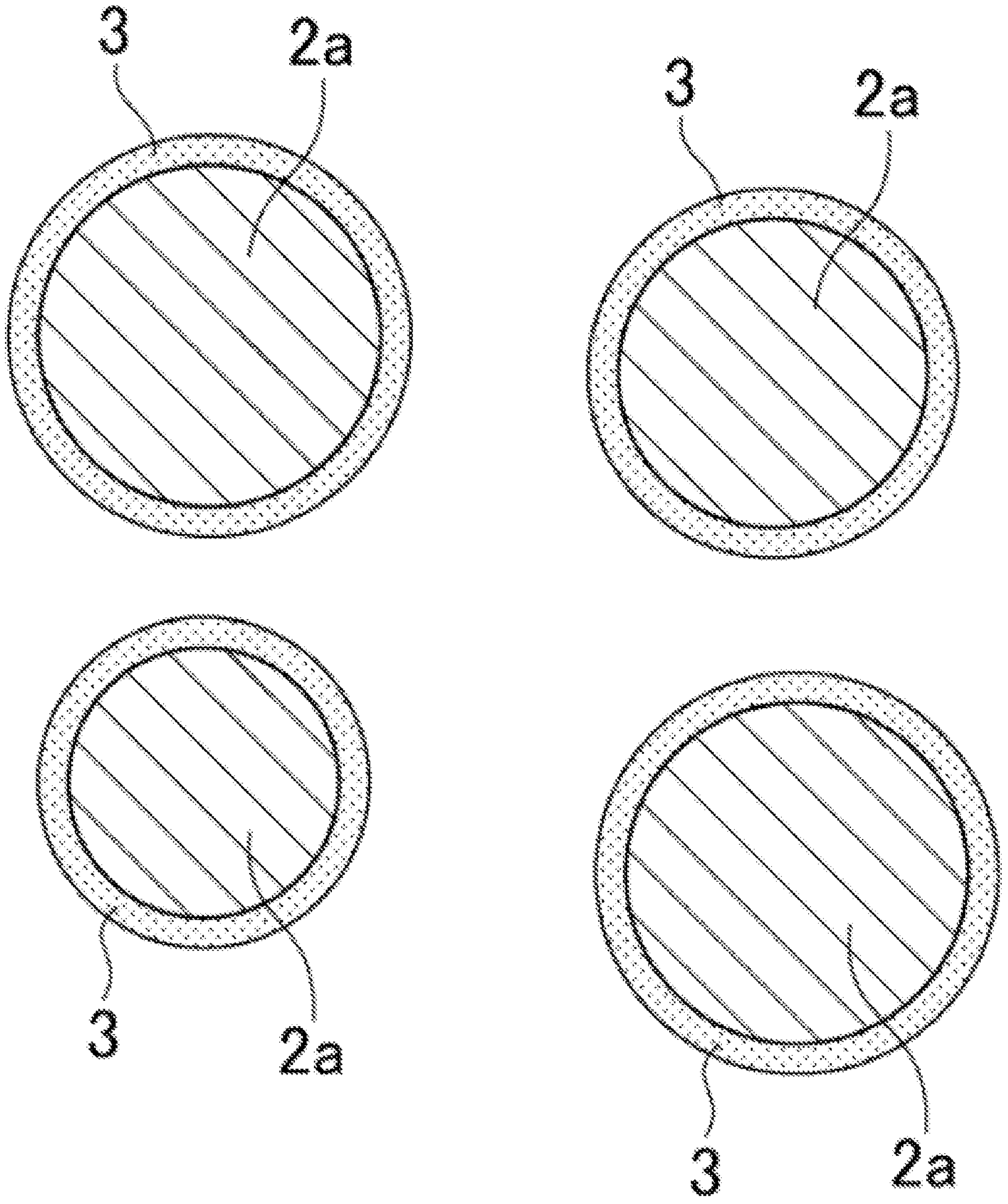
FIG. 2A schematically shows one of the steps to manufacture the composite magnetic particle relating to the embodiment of the present invention.
Figure 2B:
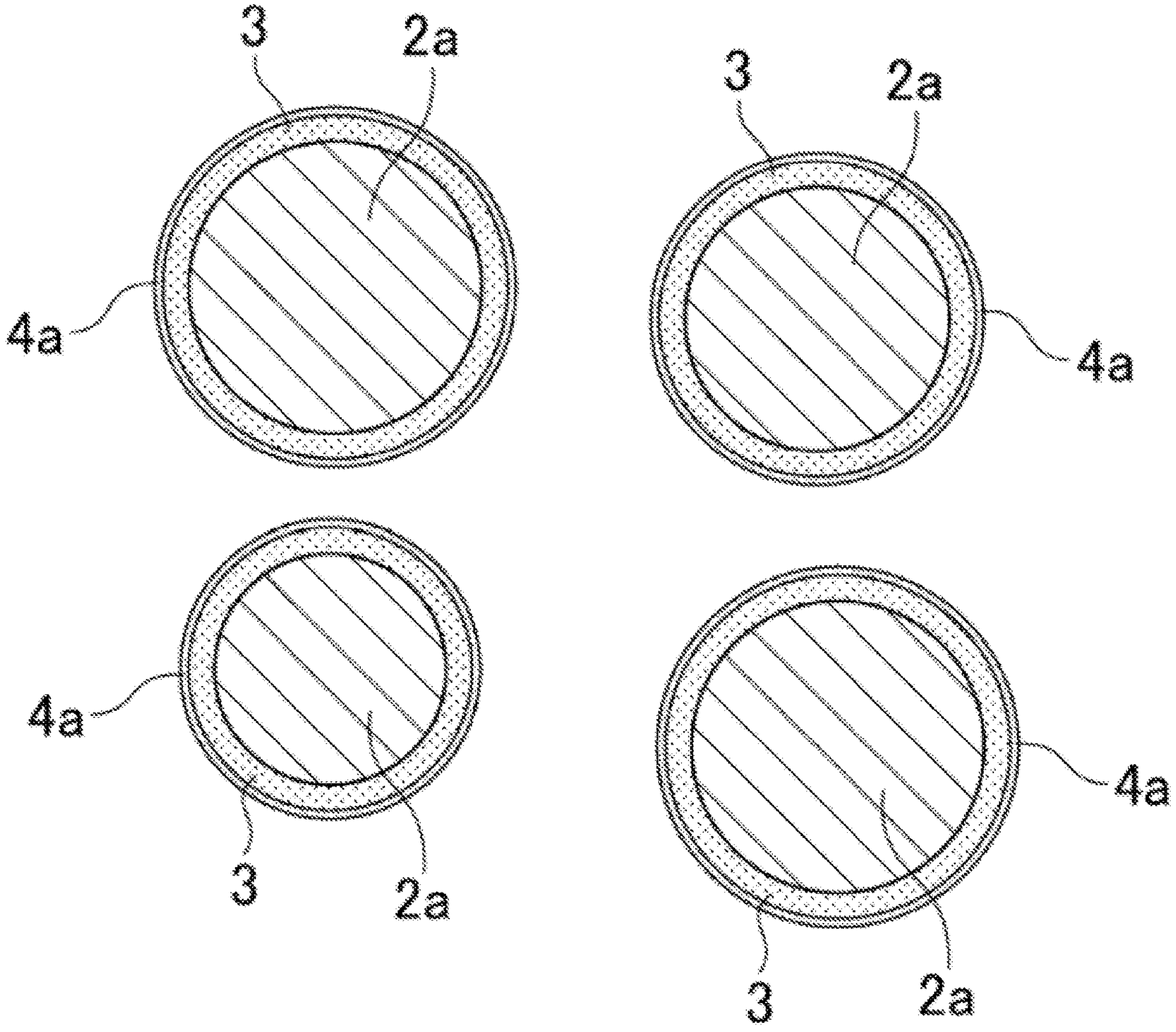
FIG. 2B schematically shows one of the steps to manufacture the composite magnetic particle relating to the embodiment of the present invention.
Figure 2C:
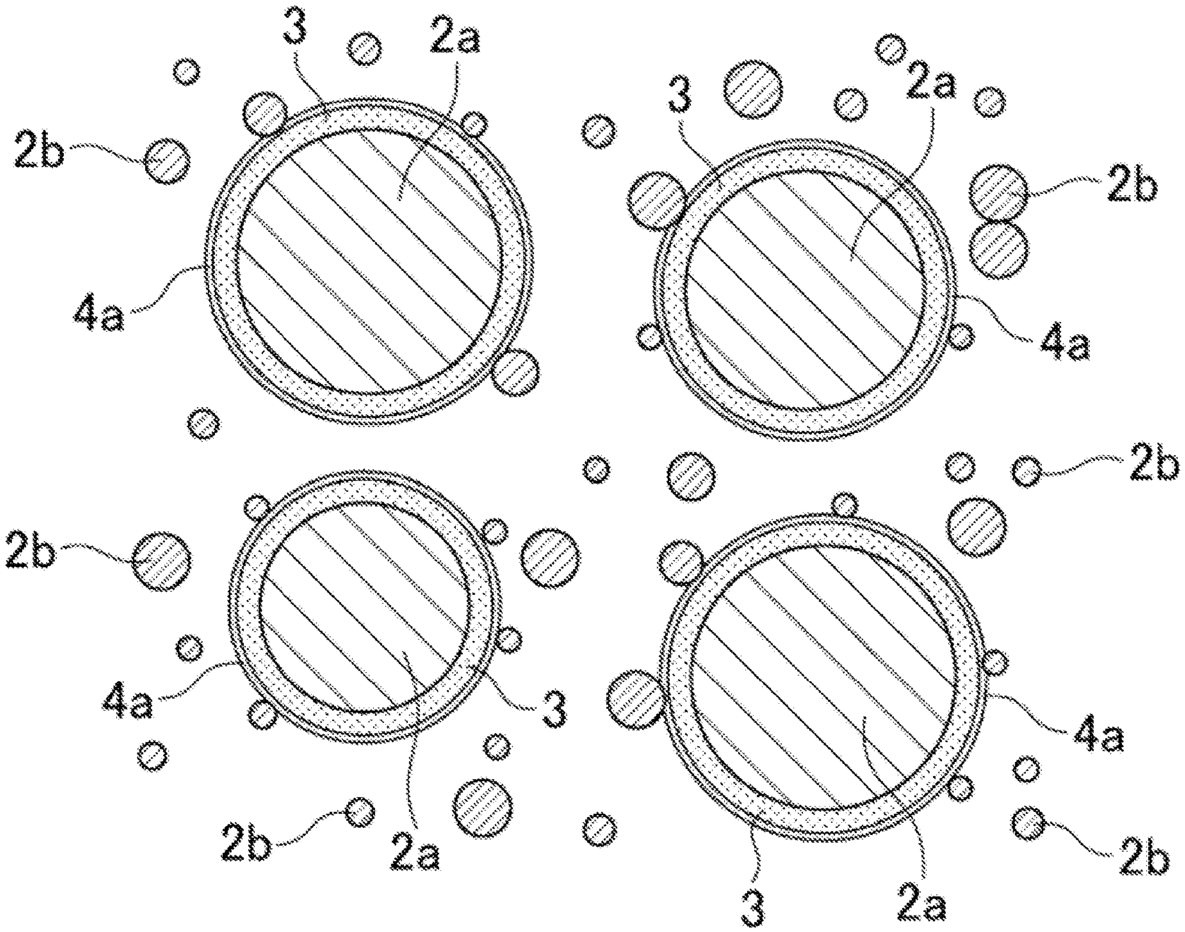
FIG. 2C schematically shows one of the steps to manufacture the composite magnetic particle relating to the embodiment of the present invention.

The following describes the method of manufacturing the composite magnetic particle 1 relating to one embodiment of the present invention with reference to FIGS. 2A to 2C.

To begin with, a plurality of first metal magnetic particles 2*a* are prepared. Subsequently, coating is performed. In this coating step, the first resin portion 3 made of the first resin material is formed on the surface of each of the first metal magnetic particles 2*a*. More specifically, the first metal magnetic particles 2*a* and a first resin solution containing the first resin material are poured into and stirred in a mixing vessel, so that a mixture of the first metal magnetic particles 2*a* and the first resin material is produced. The mixture is taken out of the mixing vessel to be dried. In this manner, the first metal magnetic particles 2*a* each having the first resin portion 3 formed thereon is obtained as shown in FIG. 2A. In the coating step, for example, to the first metal magnetic particles 2*a* of 100 wt %, the first resin material of 0.01 wt % to 5 wt % is added. A diluent such as 2-butanone may be added to the first resin solution, if necessary.

Subsequently, binding is performed. In this binding step, to the first metal magnetic particles 2*a* each having the first resin portion 3 formed thereon, the second metal magnetic particles 2*b* are bound via the second resin portion 4 made of the second resin material. More specifically, the first metal magnetic particles 2*a* each having the first resin portion 3 formed thereon and a second resin solution containing the second resin material are stirred within a mixing vessel, so that the second resin portion 4*a* made of the second resin material is formed on the surface of the first resin portion 3 as shown in FIG. 2B. In the binding step, for example, to the first metal magnetic particles 2*a* of 100 wt %, the second resin material of 1 wt % to 20 wt % is added. A diluent such as 2-butanone may be added to the second resin solution, if necessary.

Figure 2D:
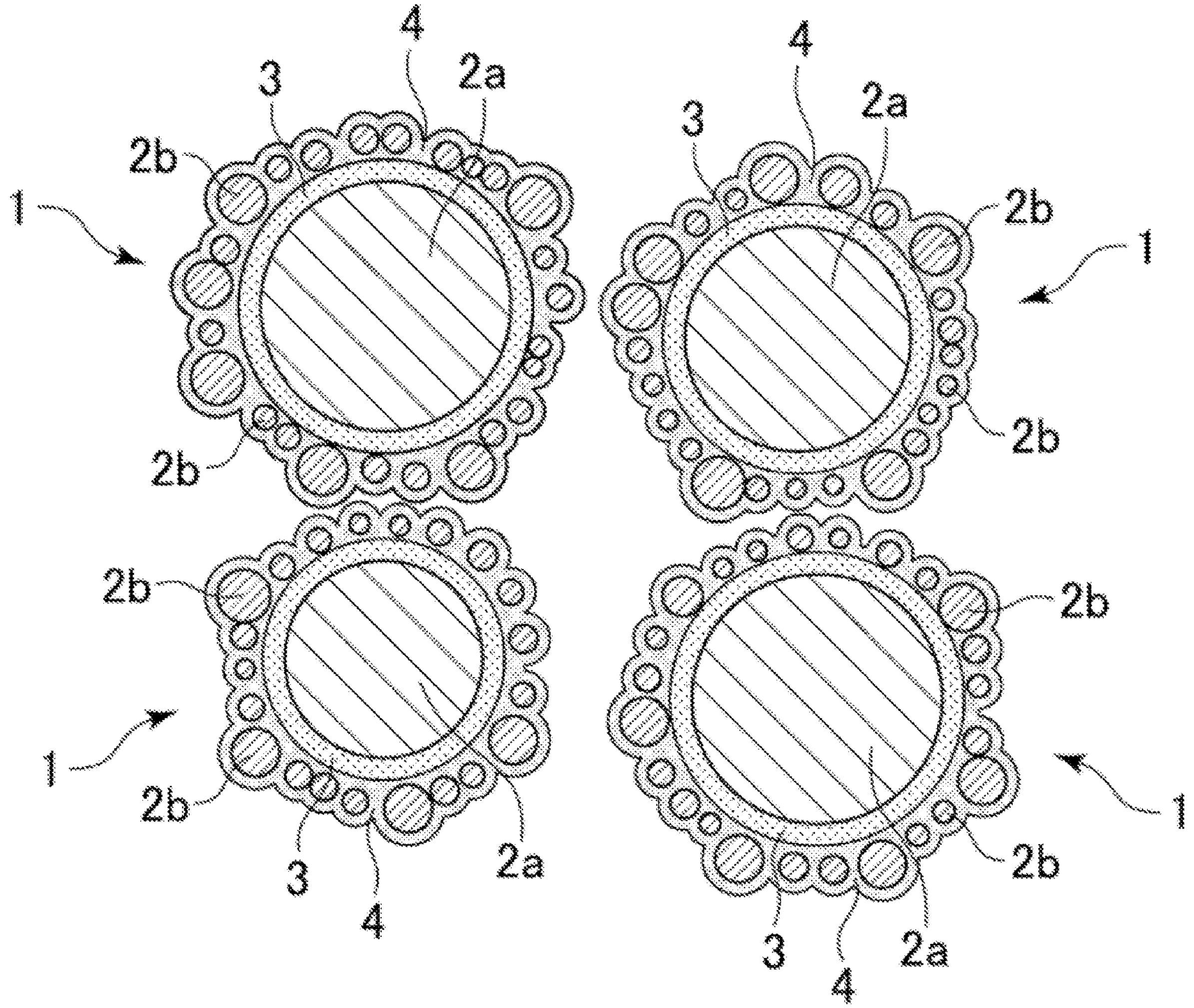
FIG. 2D schematically shows one of the steps to manufacture the composite magnetic particle relating to the embodiment of the present invention.

Subsequently, as shown in FIG. 2C, the second metal magnetic particles 2*b* are further poured into the mixing vessel, and the first metal magnetic particles 2*a* each having the second resin portion 4*a* and the second metal magnetic particles 2*b* are stirred, so that the second metal magnetic particles 2*b* are bound to the first metal magnetic particles 2*a* via the second resin portion 4 as shown in FIG. 2D. As a result of this stirring, the second resin portion 4 is provided also on the surface of the second metal magnetic particles 2*b*. As mentioned above, the second resin portion 4 may be formed on the entire or partial surface of the second metal magnetic particles 2*b*. The resulting mixture is taken out of the mixing vessel and dried, so that the composite magnetic particles 1 are obtained. The composite magnetic particle 1 obtained in the above-described manner includes the first metal magnetic particle 2*a* covered with the first resin portion 3 and the second metal magnetic particles 2*b* bound to the first metal magnetic particle 2*a* via the second resin portion 4. The composite magnetic particles 1 are subjected to sieving so that granular particles are obtained. The granular composite magnetic particles 1 are used as a magnetic material to form a magnetic base body of an electronic component, which will be described below.

In the binding step, before the second resin solution is poured, the first metal magnetic particles 2*a* each having the first resin portion 3 formed thereon and the second metal magnetic particles 2*b* may be mixed together within the mixing vessel to produce a particle mixture, and the particle mixture may be then mixed with the second resin solution. The resulting mixture is taken out of the mixing vessel and dried. In this way, the composite magnetic particle 1 can be also obtained.

According to the above-described manufacturing method, in the process of manufacturing the composite magnetic particle 1 containing the first metal magnetic particle 2*a* and the second metal magnetic particles 2*b*, the first resin portion 3 having a small molecular weight, which is likely to serve as a primer, is first formed on the surface of the first metal magnetic particle 2*a*, after which the first metal magnetic particle 2*a* having the first resin portion 3 formed thereon is mixed with the second metal magnetic particles 2*b*. This can reduce the aggregation of the second metal magnetic particles 2*b*, which is attributed to the first resin material having a small molecular weight serving as a primer.

Furthermore, the second resin portion 4 made of the second resin material having a large molecular weight is used to aggressively bind the second metal magnetic particles 2*b* to the first metal magnetic particles 2*a*. This can prevent the second metal magnetic particles 2*b* from being aggregated.

Figure 3:
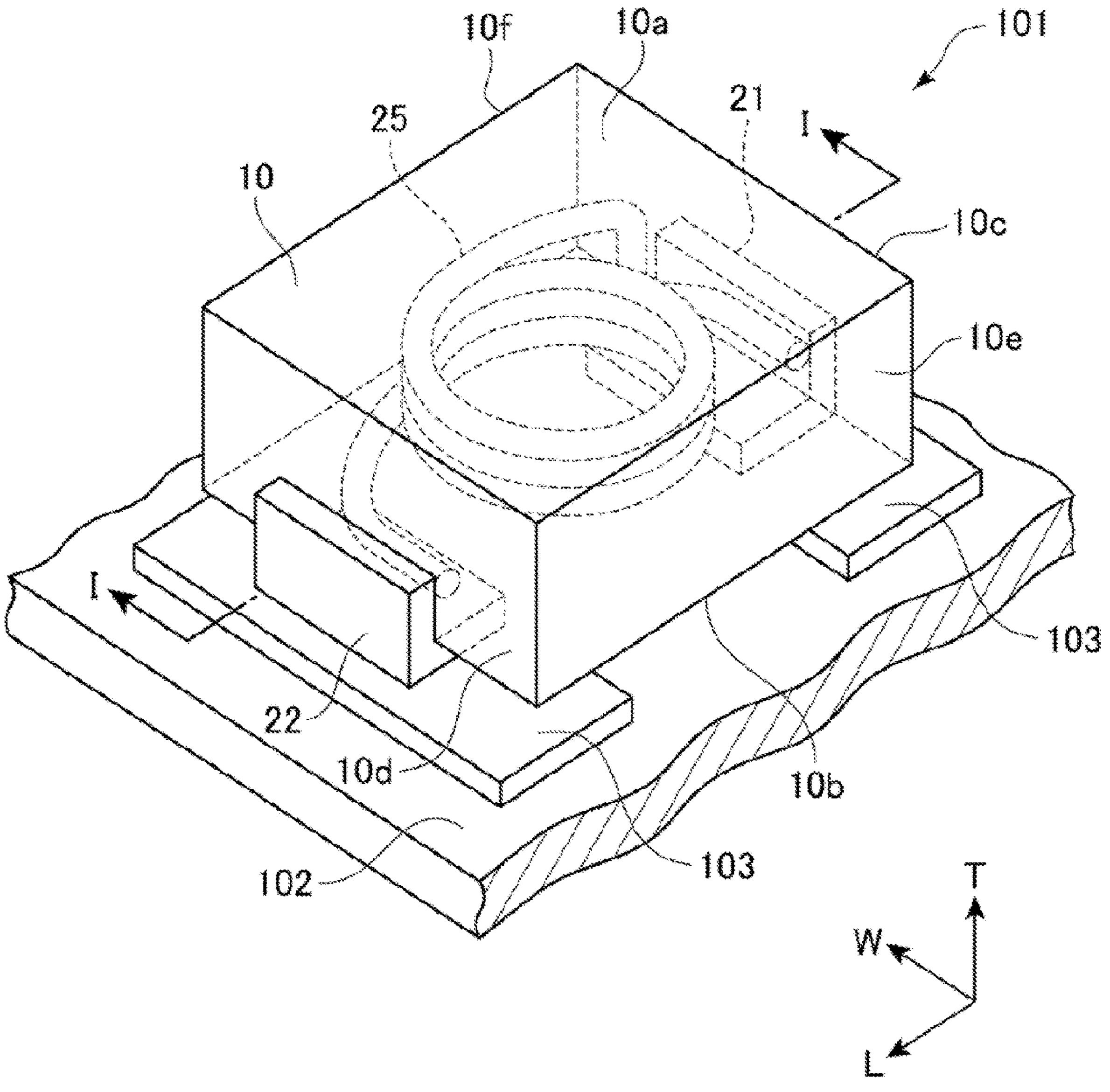
FIG. 3 is a perspective view showing a coil component relating to an embodiment of the invention.
Figure 4:
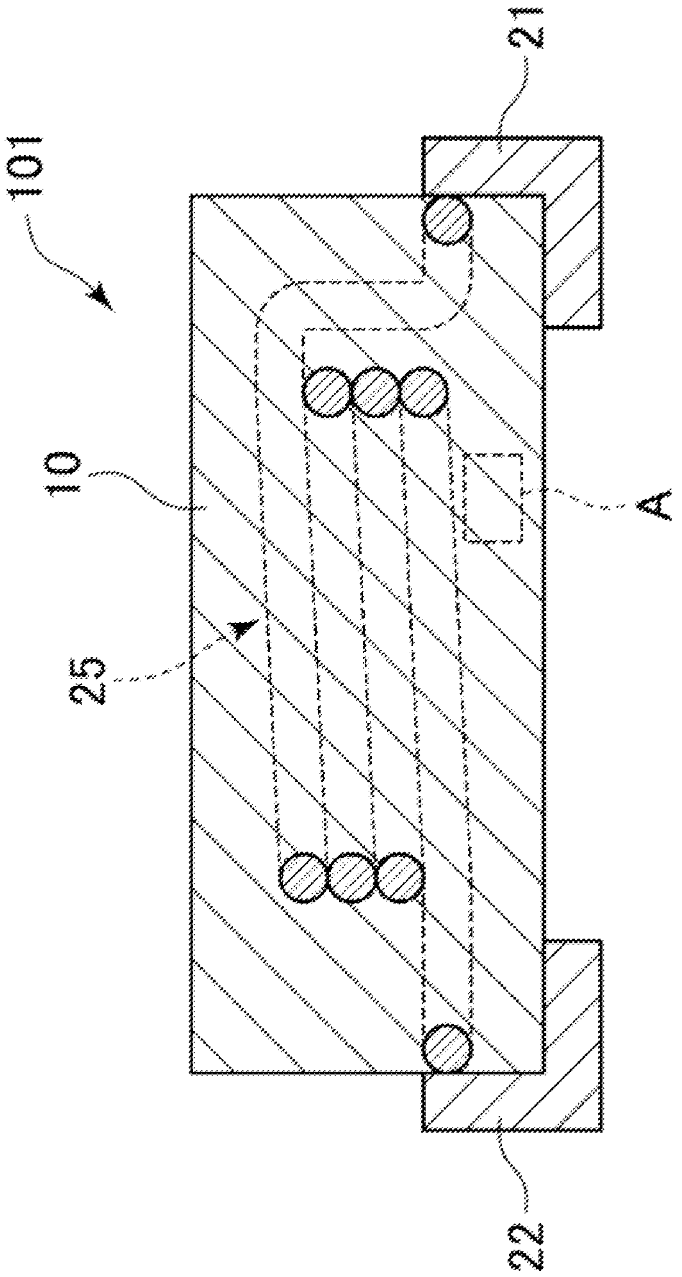
FIG. 4 schematically shows a cross section of the coil component of FIG. 3 cut along the line I-I.
Figure 5:
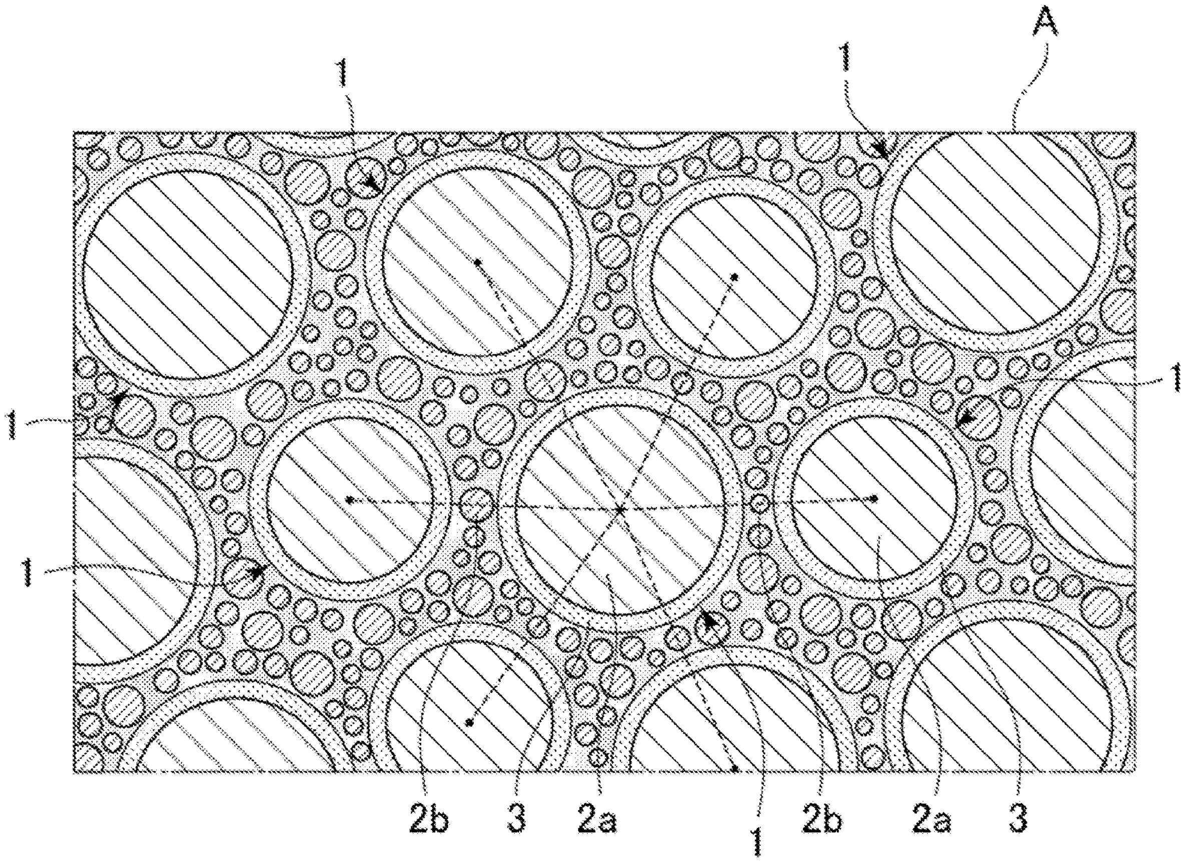
FIG. 5 schematically illustrates a captured image of a part of the cross section of FIG. 4.

The following describes an electronic component including a magnetic base body formed using the composite magnetic particles 1 with reference to FIGS. 3 to 5. FIGS. 3 to 5 show an inductor 101 as an example of the electronic component including a magnetic base body formed using the composite magnetic particles 1. FIG. 3 is a perspective view of the inductor 101 relating to one embodiment of the invention, FIG. 4 is a schematic sectional view showing the inductor 101 of FIG. 3 along the line I-I, and FIG. 5 schematically illustrates a captured image of a region A of the section of FIG. 4.

In this specification, the "length" direction, the "width" direction, and the "thickness" direction of the inductor 101 are referred to as an "L" axis direction, a "W" axis direction, and a "T" axis direction in FIG. 3, respectively, unless otherwise construed from the context.

The inductor 101 is an example coil component to which the present invention is applicable. The invention may be applied to, for example, transformers, filters, reactors, and various any other coil components in addition to inductors. Advantageous effects of the invention will be more remarkably exhibited if the invention is applied to coil components and any other electronic components to which large current is applied. An inductor used in a DC-DC converter is an example of a coil component to which large current is applied. The invention may be also applied to coupled inductors, choke coils, and any other magnetically coupled coil components, in addition to the inductors used in DC-DC converters. As will be described later, since the magnetic base body 10 has a high magnetic permeability and a high insulation property, the inductor 101 is particularly suitable as an inductor used in a power supply. Applications of the inductor 101 are not limited to those explicitly described herein.

As shown in the drawings, the inductor 101 includes a magnetic base body 10 formed using the composite magnetic particles 1, a coil conductor 25 embedded in the magnetic base body 10, an external electrode 21 electrically connected to one end of the coil conductor 25, and an external electrode 22 electrically connected to the other end of the coil conductor 25.

The magnetic base body 10 is formed of a magnetic material in a rectangular parallelepiped shape. In one embodiment of the invention, the magnetic base body 10 has a length (the dimension in the direction L) of 1.0 to 2.6 mm, a width (the dimension in the direction W) of 0.5 to 2.1 mm, and a thickness (the dimension in the direction T) of 0.5 to 1.0 mm. Alternatively, the dimension in the length direction may be 0.3 to 1.6 mm. The top surface and the bottom surface of the magnetic base body 10 may be covered with a cover layer.

The inductor 101 shown in the drawings is mounted on a circuit board 102. A land portion 103 may be provided on the circuit board 102. In the case where the inductor 101 includes the two external electrodes 21 and 22, the circuit board 102 is provided with the two land portions 103 correspondingly. The inductor 101 may be mounted on the circuit board 102 by bonding each of the external electrodes 21, 22 to the corresponding one of the land portions 103 on the circuit board 102. The circuit board 102 can be mounted in various electronic devices. Electronic devices with which the circuit board 102 may be equipped include smartphones, tablets, game consoles, and various other electronic devices. The inductor 101 may be suitably used in the circuit board 102 on which components are densely mounted. The inductor 101 may be a built-in component embedded in the circuit board 102.

The magnetic base body 10 has a first principal surface 10*a*, a second principal surface 10*b*, a first end surface 10*c*, a second end surface 10*d*, a first side surface 10*e*, and a second side surface 10*f*. The outer surface of the magnetic base body 10 may be defined by these six surfaces. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other.

As shown in FIG. 3, the first principal surface 10*a* lies on the top side in the magnetic base body 10, and therefore, the first principal surface 10*a* may be herein referred to as "the top surface." Similarly, the second principal surface 10*b* may be referred to as "the bottom surface." The inductor 101 is disposed such that the second principal surface 10*b* faces the circuit board 2, and therefore, the second principal surface 10*b* may be herein referred to as "the mounting surface." The top-bottom direction of the inductor 1 refers to the top-bottom direction in FIG. 3.

The external electrode 21 is provided on the first end surface 10*c* of the magnetic base body 10. The external electrode 22 is provided on the second end surface 10*d* of the magnetic base body 10. As shown, these external electrodes may extend to the bottom surface of the magnetic base body 10. The shapes and positions of the external electrodes are not limited to the illustrated example. For example, both of the external electrodes 21, 22 may be provided on the bottom surface 10*b* of the magnetic base body 10. In this case, the coil conductor 25 is connected to the external electrodes 21, 22 on the bottom surface 10*b* of the magnetic base body 10 through via conductors. The external electrodes 21 and 22 may be separated from each other in the length direction.

An example method of fabricating the inductor 101 relating to one embodiment of the present invention will now be described. The following describes the method of fabricating the inductor 101 by way of compression molding. When the inductor 101 is fabricated using compression molding, the method of fabricating the inductor 101 includes a molding step of subjecting the composite magnetic particles 1 to compression molding to form a molded body and a heat treatment step of heating the molded body produced by the molding step. In the molding step, a binder may be added as necessary. The binder may contain a boning agent designed to bond particles together, a lubricant designed to improve particle flow and a mold release agent designed to facilitate separation of a molded body from a mold.

In the molding step, the composite magnetic particles 1 are prepared. Next, a coil conductor, which is prepared in advance, is placed in a mold, the composite magnetic particles 1 are then poured into the mold in which the coil conductor is disposed, and a compacting pressure is applied thereto to obtain a molded body containing the coil conductor thereinside. The molding step may be performed by warm molding or may be performed by cold molding. When the warm molding is performed, the molding step is performed at a temperature that is lower than the thermal decomposition temperature of the first and second resin materials and the binder and does not affect crystallization of the soft magnetic metal particles. For example, the warm molding is performed at a temperature of 150° C. to 400° C. The compacting pressure is, for example, 40 MPa to 120 MPa. The compacting pressure can be appropriately adjusted to obtain a desired filling rate.

After the molded body is obtained by the molding step, the fabrication method proceeds to the heat treatment step. In the heat treatment step, heat treatment is performed on the molded body obtained by the molding step and produces a magnetic base body. The heat treatment forms an oxide film on the surface of the composite magnetic particles 1, so that the adjacent composite magnetic particles 1 are bonded to each other via the oxide film sandwiched therebetween. When the first and second resin materials are thermosetting resins, the heat treatment lasts at the curing temperature of the resins, for example, at a temperature from 150° C. to 200° C. for a duration of 30 minutes to 4 hours. When the first and second resin materials are thermally decomposable resins, the heat treatment step includes a step of degreasing the molded body produced by the molding step and a step of heating the degreased molded body within an oxidizing atmosphere. When the first resin material is a thermally decomposable resin, the degreasing can remove the first resin material. Similarly, when the second resin material is a thermally decomposable resin, the degreasing can remove the second resin material. When a binder is added, the degreasing also removes the binder. The degreasing may be independently performed from the heating. The duration of the heating in the heating step is, for example, 20 minutes to 120 minutes, and the heating temperature is, for example, 600° C. to 900° C.

Next, a conductor paste is applied to both end portions of the magnetic base body 10, which is produced in the above-described manner, to form the external electrode 21 and the external electrode 22. The external electrode 21 and the external electrode 22 are provided such that they are electrically coupled to respective ends of the coil conductor provided in the magnetic base body. The external electrodes may include a plating layer. There may be two or more plating layers. The two plating layers may include an Ni plating layer and an Sn plating layer externally provided on the Ni plating layer. In the above-described manner, the inductor 101 is obtained.

The schematic cross section of the magnetic base body 10 is shown in FIG. 5. FIG. 5 schematically shows a scanning electron microscope (SEM) photograph of a region A of the cross section of the magnetic base body 10 taken by SEM with a magnification ratio of 2000. As the scanning electron microscope, JSM-6700F available from JEOL Ltd. can be used. The region A is an arbitrary region in the magnetic base body 10.

As shown in the drawing, the magnetic base body 10 includes a plurality of first magnetic metal particles 2*a* and a plurality of second metal magnetic particles 2*b*. The second metal magnetic particles 2*b* have a smaller average particle size than the first magnetic metal particles 2*a*. The average particle size of the metal magnetic particles (for example, the first metal magnetic particles 2*a* and the second metal magnetic particles 2*b*) contained in the composite magnetic particles 1 included in the magnetic base body 10 is determined in the following manner. The magnetic base body is cut along the thickness direction (the T direction) to expose the cross section. The cross section is photographed using a scanning electron microscope (SEM) with a magnification ratio of 1000 to 3000, and the photograph is used to obtain a particle size distribution. The particle size distribution is used to determine the average particle size. For example, the value at 50 percent of the particle size distribution determined based on the SEM photograph can be set as the average particle size of the soft magnetic metal particles. The first metal magnetic particles 2*a* in the magnetic base body 10 have an average particle size of 10 to 30 μm, and the second metal magnetic particles 2*b* have an average particle size of 0.05 to 10 μm. According to the particle size distribution obtained based on the SEM photograph, the second metal magnetic particles 2*b* may exhibit two or more peaks. In other words, the second metal magnetic particles 2*b* may be a particle mixture obtained mixing together two types of metal magnetic particles having different average particle sizes. In the particle mixture, the metal magnetic particles having a smaller average particle size have a particle size of, for example, 0.05 to 5 μm and a specific surface area ratio (BET value) of 50 $m^2/g$ or less. By referring to an SEM photograph of the composite magnetic particles 1 obtained using a scanning electronic microscope (SEM) with a magnification ratio of approximately 10000 to 40000, the first and second resin portions 3 and 4 can be distinguished from the first and second metal magnetic particles 2*a* and 2*b* based on the difference in brightness.

The first magnetic metal particles 2*a* are each covered with the first resin portion 3. The second metal magnetic particles 2*b* are each covered with the second resin portion 4. The second metal magnetic particles 2*b* are each bonded to the first metal magnetic particles 2*a* via at least one selected from the group consisting of the first resin portion 3 and the second resin portion 4. At least one selected from the group consisting of the first resin portion 3 and the second resin portion 4 intervenes between each first metal magnetic particle 2*a* and the surrounding second metal magnetic particles 2*b*. FIG. 5 shows a case where both the first resin portion 3 and the second resin portion 4 are present between each first metal magnetic particle 2*a* and the surrounding second metal magnetic particles 2*b*, but it may be only one selected from the group consisting of the first resin portion 3 and the second resin portion 4 may be present between each first metal magnetic particle 2*a* and the surrounding second metal magnetic particles 2*b* since the first resin portion 3 and the second resin portion 4 flow during the fabrication of the magnetic base body 10 (particularly, in the compression molding step). FIG. 5 clearly shows the boundary between the first resin portion 3 and the second resin portion 4, but actual SEM images may not clearly and visibly show part of the boundary between the first resin portion 3 and the second resin portion 4.

As shown in the drawing, at least one second metal magnetic particle 2*b* desirably intervenes between adjacent first metal magnetic particles 2*a*. Since the first metal magnetic particles 2*a* and the second metal magnetic particles 2*b* flow during the compression molding step, some of the pairs of adjacent first metal magnetic particles 2*a* may have no second metal magnetic particles 2*b* intervening between the adjacent first metal magnetic particles 2*a*. In one embodiment of the present invention, when 50 pairs of adjacent first metal magnetic particles 2*a* are observed, 15% or less of the pairs have no second metal magnetic particles 2*b* between the adjacent first metal magnetic particles 2*a*. It can be judged that there is no second metal magnetic particles 2*b* between adjacent first metal magnetic particles 2*a*, if the cross-sectional observation using SEM photographs confirms that there is no second metal magnetic particles 2*b* on the straight line connecting the geometric centers of gravity of the adjacent first metal magnetic particles 2*a*. FIG. 5 uses broken lines to identify the imaginary line connecting the center of gravity of the first metal magnetic particle 2*a* that is arranged at approximately the center of the field of view and the centers of gravity of six first metal magnetic particles 2*a* adjacent to the first metal magnetic particle 2*a*. Since the second metal magnetic particles 2*b* are arranged on the six imaginary lines, it can be judged that there are second metal magnetic particles 2*b* in the six pairs of adjacent first metal magnetic particles 2*a*.

When the first resin material is a thermally decomposable resin, the first resin material may be removed during the manufacturing process. In this case, the magnetic base body 10 may contain no first resin portion 3. Likewise, when the second resin material is a thermally decomposable resin, the second resin material may be removed during the manufacturing process. In this case, the magnetic base body 10 may contain no second resin portion 4. For these reasons, the SEM photograph of the magnetic base body 10 may show no first or second resin portion 3 or 4.

The distributions of the first metal magnetic particles 2*a* and the second metal magnetic particles 2*b* on the cross section of the magnetic base body 10 are examined with a scanning electron microscope suitably with a magnification ratio of 1000 to 3000. When the cross section of the magnetic base body 10 is observed, the magnification ratio of the scanning electron microscope can be adjusted between 1000 to 3000 as appropriate.

The region A may contain air gaps in addition to the first metal magnetic particles 2*a*, the second metal magnetic particles 2*b*, the first resin portion 3 and the second resin portion 4. The air gaps may be filled with a resin other than the first resin portion 3 and the second resin portion 4. The resin used to fill the air gaps may be, for example, a highly insulating thermosetting resin. Examples of the thermosetting resin used to form the magnetic base body 10 may include benzocyclobutene (BCB), an epoxy resin, a phenolic resin, an unsaturated polyester resin, a vinyl ester resin, a polyimide resin (PI), a polyphenylene ether (oxide) resin (PPO), a bismaleimide-triazine cyanate ester resin, a fumarate resin, a polybutadiene resin, and a polyvinyl benzyl ether resin.

Figure 6:
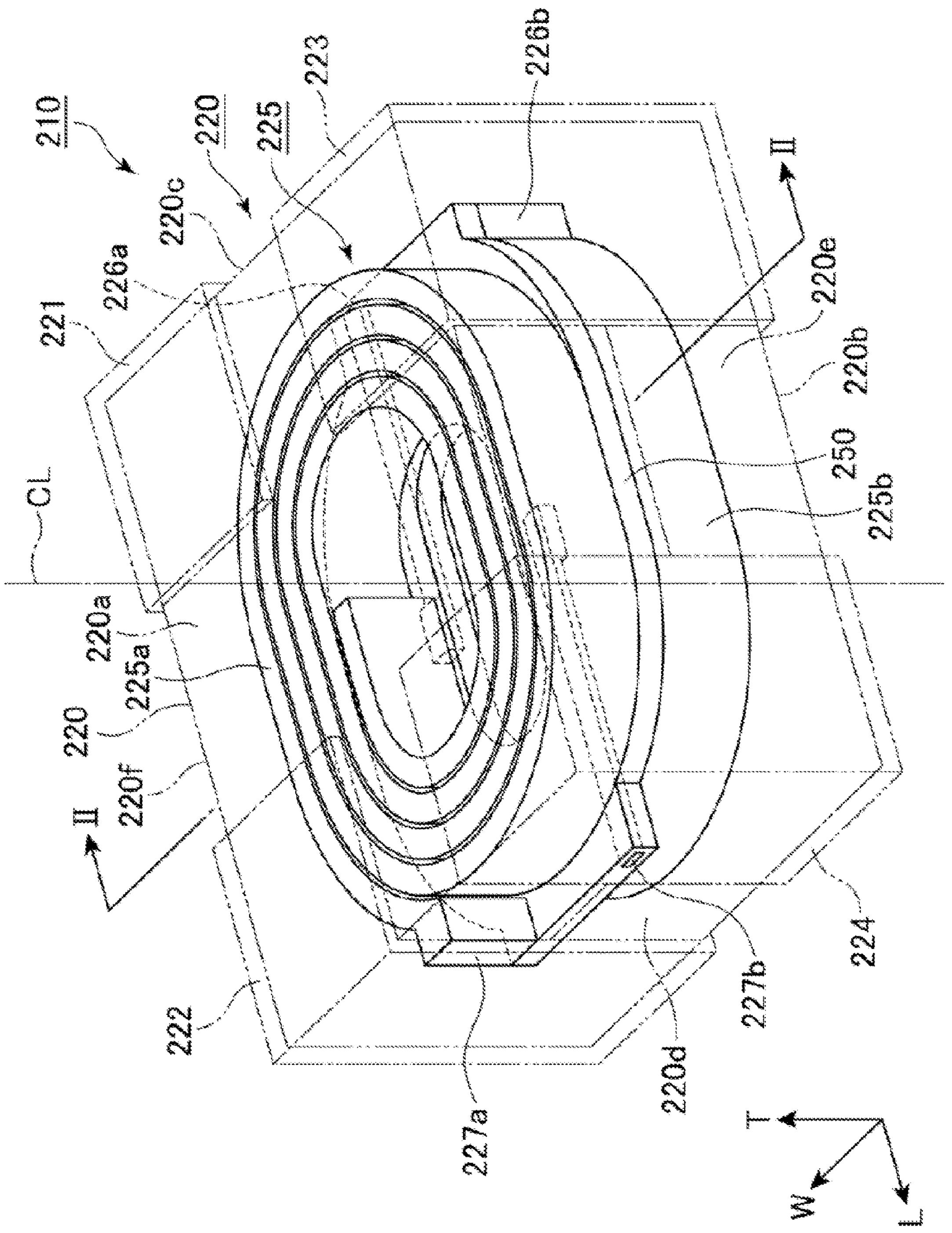
FIG. 6 is a perspective view showing a coil component relating to another embodiment of the invention.
Figure 7:
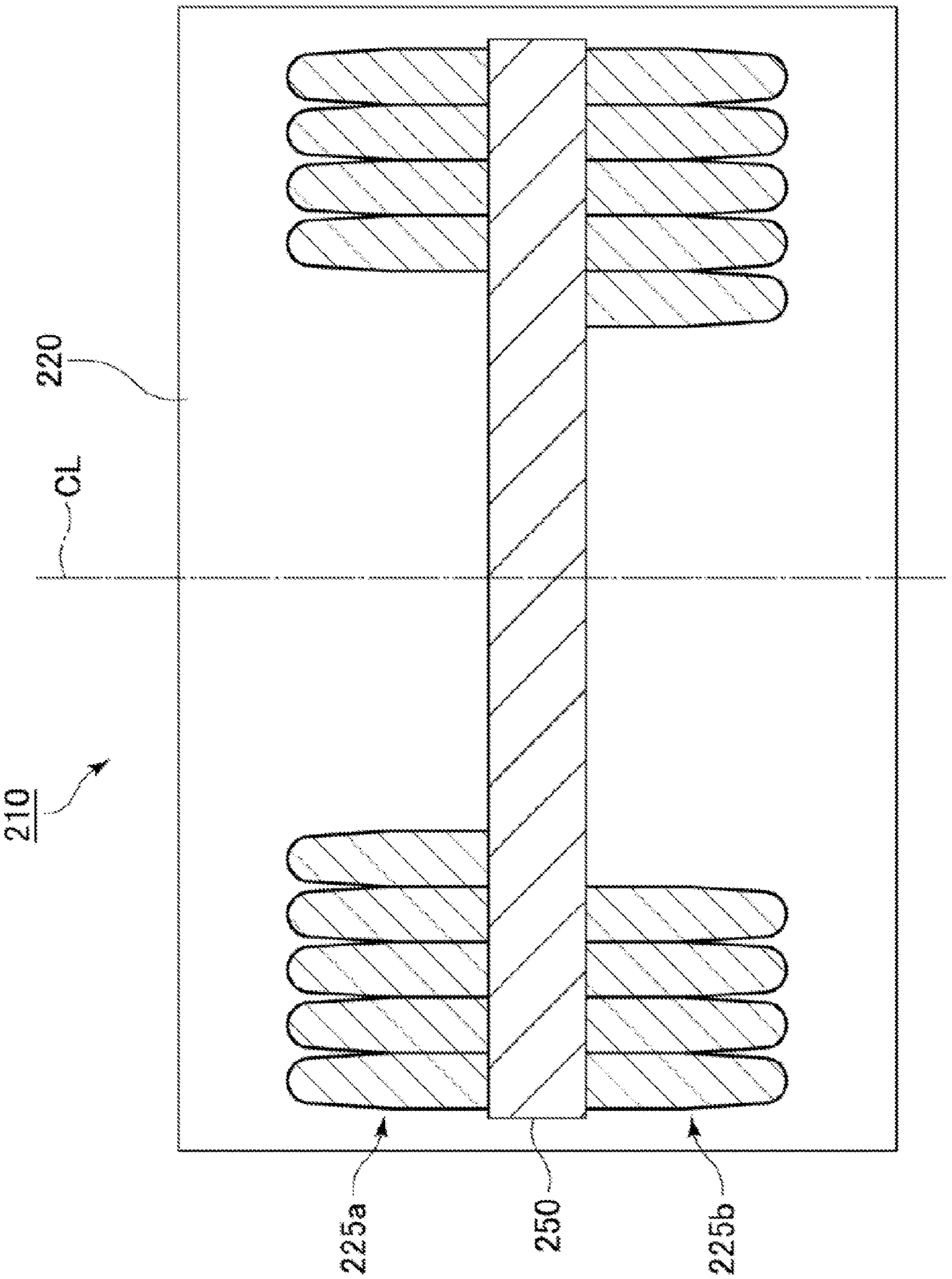
FIG. 7 schematically shows a cross section of the coil component of FIG. 6 cut along the line II-II.

Next, a coil component relating to another embodiment of the present invention will be described with reference to FIGS. 6 and 7. As shown in FIGS. 6 and 7, a coil component 210 relating to one embodiment of the present invention includes a magnetic base body 220, coil conductors 225 embedded in the magnetic base body 220, an insulating plate 250 embedded in the magnetic base body 220, and four external electrodes 221 to 224.

In one embodiment of the invention, the magnetic base body 220 contains the above-described composite magnetic particles 1. The magnetic base body 220 has a first principal surface 220*a*, a second principal surface 220*b*, a first end surface 220*c*, a second end surface 220*d*, a first side surface 220*e*, and a second side surface 220*f*. The outer surface of the magnetic base body 220 is defined by these six surfaces.

The insulating plate 250 is made of an insulating material and has a plate-like shape. The insulating material used for the insulating plate 250 may be magnetic. The magnetic material used for the insulating plate 250 is, for example, a composite magnetic material containing a bonding agent and magnetic particles. In one embodiment of the invention, the insulating plate 250 has a larger resistance than the magnetic base body 220. Thus, even when the insulating plate 250 has a small thickness, electric insulation between a coil conductor 225*a* and a coil conductor 225*b* can be ensured.

In the embodiment shown, the coil conductors 225 include the coil conductor 225*a* formed on the top surface of the insulating plate 250 and a coil conductor 225*b* formed on the bottom surface of the insulating plate 250. The coil conductor 225*a* is formed in a predetermined pattern on the top surface of the insulating plate 250, and the coil conductor 225*b* is formed in a predetermined pattern on the bottom surface of the insulating plate 250. An insulating film may be provided on the surface of the coil conductors 225*a* and 225*b*. In the coil component 210 shown, the coil conductor 225*a* and the coil conductor 225*b* are magnetically coupled. The coil component 210 can be formed without the coil conductor 225*b*. In this case, the coil component 210 includes the coil conductor 225*a* formed on the top surface of the insulating plate 250 but has no coil conductors formed on the bottom surface of the insulating plate 250. The coil conductors 225 can be provided in various shapes. When seen from above, the coil conductors 225 have, for example, a spiral shape, a meander shape, a linear shape or a combined shape of these.

The coil conductor 225*a* has a lead-out conductor 226*a* on one end thereof and a lead-out conductor 227*a* on the other end. The lead-out conductor 226*a* is used to establish electrical connection with the external electrode 221, and the lead-out conductor 227*a* is used to establish electrical connection with the external electrode 222. Likewise, the coil conductor 225*b* has a lead-out conductor 226*b* on one end thereof and a lead-out conductor 227*b* on the other end. An internal conductor of the coil conductor 225*b* is electrically connected to the external electrode 223 via the lead-out conductor 226*b* and is electrically connected to the external electrode 224 via the lead-out conductor 227*b*.

In the embodiment shown, the external electrode 221 is electrically connected to one end of the coil conductor 225*a*, and the external electrode 222 is electrically connected to the other end of the coil conductor 225*a*. The external electrode 223 is electrically connected to one end of the coil conductor 225*b*, and the external electrode 224 is electrically connected to the other end of the coil conductor 225*b*. The external electrode 221 and the external electrode 223 are provided on the first end surface 220*c* of the magnetic base body 220. The external electrode 222 and the external electrode 224 are provided on the second end surface 220*d* of the magnetic base body 220. As shown, these external electrodes may extend to the top and bottom surfaces 220*a* and 220*c* of the magnetic base body 220. The shapes and positions of the external electrodes 221 to 224 may be changed as appropriate.

The following describes an example method of fabricating the coil component 210. To start with, an insulating plate made of a magnetic material and shaped like a plate is prepared. Next, a photoresist is applied to the top surface and the bottom surface of the insulating plate, and then conductive patterns are transferred onto the top surface and the bottom surface of the insulating plate by exposure, and development is performed. As a result, a resist having an opening pattern for forming a coil conductor is formed on each of the top surface and the bottom surface of the insulating plate. For example, the conductor pattern formed on the top surface of the insulating plate corresponds to the coil conductor 225*a* described above, and the conductor pattern formed on the bottom surface of the insulating plate corresponds to the coil conductor 225*b* described above. The coil conductor 225*a* and the coil conductor 225*b* may be formed by electrically connecting together, for example, through conductive vias, two or more coil patterns formed in two or more layers.

Next, plating is performed, so that each of the opening patterns is filled with a conductive metal. Next, etching is performed to remove the resists from the insulating plate, so that the coil conductors are formed on the top surface and the bottom surface of the insulating plate.

A magnetic base body is subsequently formed on both surfaces of the insulating plate having the coil conductors formed thereon. This magnetic base body corresponds to the magnetic base body 220 described above. To form the magnetic base body, a magnetic sheet is first fabricated. The magnetic sheet is fabricated by mixing and kneading a group of composite magnetic particles 1 and a binder while heating them to form a mixed resin composition, pouring the mixed resin composition into a sheet-shaped mold and then cooling the mixed resin composition in the sheet-shaped mold. The binder can be, for example, a resin having a smaller average molecular weight than the second resin material. The addition of the binder may be skipped. When no binder is used, the second resin material serves as a binder. If a resin having a smaller molecular weight than the second resin material is used as a binder, the mixed resin composition becomes more flowable, so that the mixed resin composition can be easily poured to fill the mold. In the above manner, a pair of magnetic sheets are fabricated. Next, the above-described coil conductors are placed between the magnetic sheets and pressure is applied to them while they are heated. In this way, a laminated body is fabricated. Next, the laminated body is subjected to heat treatment at the curing temperature of the resin, for example, at a temperature of 150° C. to 200° C. for a duration of 30 minutes to four hours. In this way, a magnetic base body having coil conductors therein can be obtained. An external electrode is provided on the external surface of the magnetic base body at a predetermined position. In this manner, the coil component 210 is completed.

Figure 8:
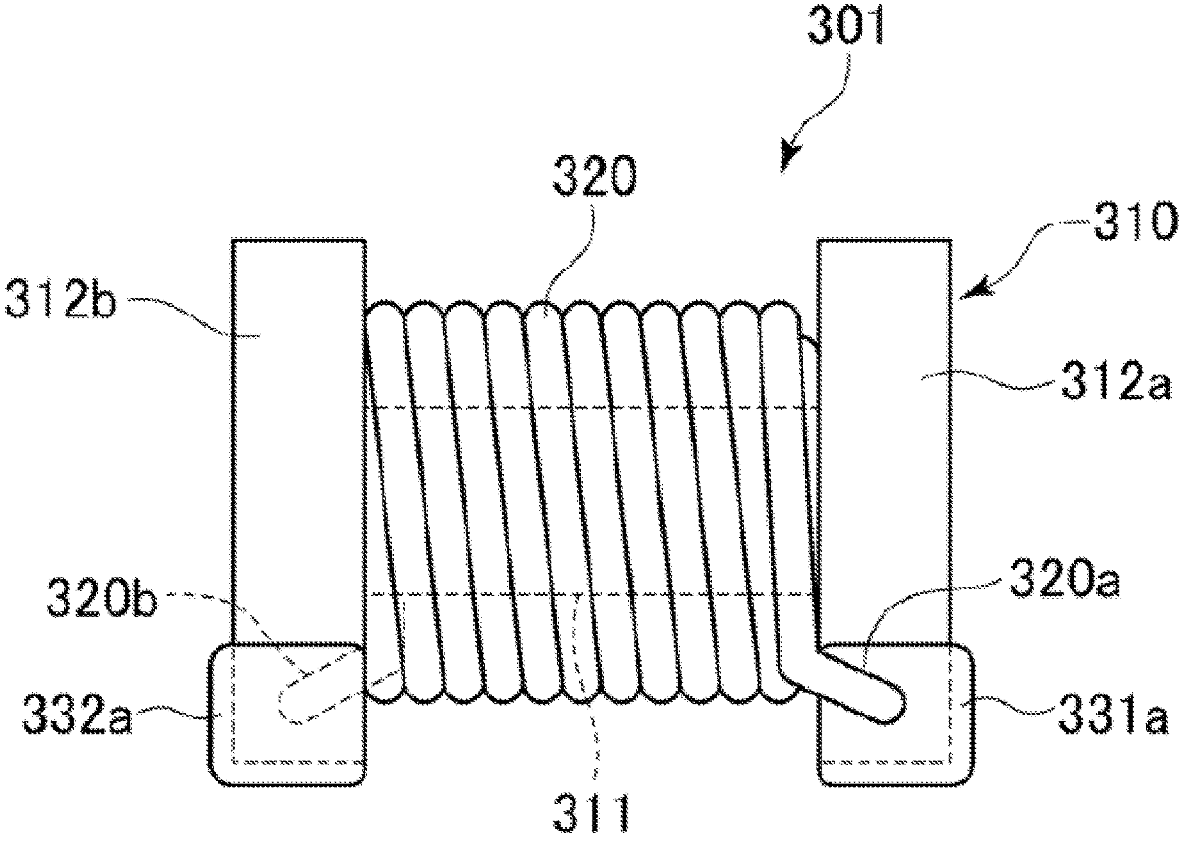
FIG. 8 is a perspective view showing a coil component relating to still another embodiment of the invention.

The following describes a coil component 301 relating to another embodiment of the present invention with reference to FIG. 8. The inductor 301 relating to one embodiment of the present invention is a winding inductor. As shown, the coil component 301 includes a drum core 310, a winding wire 320, a first external electrode 331*a* and a second external electrode 332*a*. The drum core 310 includes a winding core 311, a flange 312*a* having a rectangular parallelepiped shape and provided on one end of the winding core 311, and a flange 312*b* having a rectangular parallelepiped shape and provided on the other end of the winding core 311. The winding wire 320 is wound on the winding core 311. The winding wire 320 is formed by applying an insulation coating around a conductor wire made of a metal material having excellent electrical conductivity. The first external electrode 331*a* extends along the bottom surface of the flange 312*a*, and the second external electrode 332*a* extends along the bottom surface of the flange 312*b*.

The drum core 310 is made of a magnetic material containing the above-described composite magnetic particles 1. The drum core 310 is produced by, for example, mixing the above-described composite magnetic particles 1 with a lubricant, pouring the mixed material to fill a cavity of a mold, pressing the mixed material to prepare a green compact, and sintering the green compact. The drum core 310 can also be produced by mixing the powders of the magnetic material or the non-magnetic material described above with a resin, a glass, or an insulating oxide (e.g., Ni—Zn ferrite or silica), molding the mixed material, and hardening or sintering the mixed material. The inductor 301 is produced by winding the winding wire 320 around the drum core 310, connecting one end of the winding wire 320 to the first external electrode 331*a*, and connecting the other end to the second external electrode 332*a*.

Advantageous effects of the above embodiments will be now described. According to one of the embodiments described above, in the process of manufacturing the composite magnetic particle 1 containing the first metal magnetic particle 2*a* and the second metal magnetic particles 2*b*, the first resin portion 3 made of a first resin material having a small molecular weight, which is likely to serve as a primer, is first formed on the first metal magnetic particle 2*a*, and the second metal magnetic particles 2*b* are then bound to the first metal magnetic particle 2*a* having the first resin portion 3 formed thereon. In this way, the second metal magnetic particles 2*b* can be prevented from being aggregated, which is attributed to the first resin material having a small molecular weight serving as a primer. Furthermore, the second resin portion 4 made of the second resin material having a large molecular weight is used to aggressively bind the second metal magnetic particles 2*b* to the first metal magnetic particles 2*a*. This can prevent the second metal magnetic particles 2*b* from being aggregated.

In one of the embodiments described above, the first metal magnetic particles 2*a* having the first resin portion 3 formed thereon and the second resin solution containing therein the second resin material are stirred within a mixing vessel, after which the second metal magnetic particles 2*b* are poured into the mixing vessel. In this way, the second metal magnetic particles 2*b* are mixed within the resin solution containing the second resin material having a large molecular weight. In this way, the second metal magnetic particles 2*b* can be prevented from being aggregated.

In one of the embodiments describe above, the first metal magnetic particles 2*a* having the first resin portion 3 formed thereon are mixed with the second metal magnetic particles 2*b* within a mixing vessel to produce a particle mixture. This particle mixture is mixed with the second resin solution. The step of producing the particle mixture encourages the second metal magnetic particles 2*b* to be bonded to the first metal magnetic particles 2*a*. Accordingly, the second metal magnetic particles 2*b* can be prevented from being aggregated.

In one of the embodiments described above, the second metal magnetic particles 2*b* are placed around the first metal magnetic particles 2*a*, so that the metal magnetic particle filling rate can be raised in the magnetic base body. In addition, since the second metal magnetic particles 2*b* are placed around the first metal magnetic particles 2*a*, the first metal magnetic particles 2*a* can be prevented from being unevenly distributed in the magnetic base body 10. In other words, the first metal magnetic particles 2*a* can be evenly distributed in the magnetic base body 10. As the DC current running through the coil conductor 25 increases, magnetic saturation occurs sequentially from a magnetic path with a higher proportion of the first metal magnetic particles 2*a* having a large particle size among a plurality of magnetic paths of the magnetic flux passing through the magnetic base body. Since the uneven distribution of the first metal magnetic particles 2*a* can be prevented, local magnetic saturation can be prevented from occurring.

Since the inductor 101 relating to the above-described embodiment can achieve a higher metal magnetic particle filling rate in the magnetic base body 10, fewer air gaps can be accordingly made in the magnetic base body 10. In particular, the magnetic base body 10 relating to the above-described embodiment can achieve a water absorption rate of less than 2.0%, even less than 1.0%.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the embodiments described, and it is also possible to omit some of the constituent elements described for the embodiments.

What is claimed is:

1. A composite magnetic particle comprising:

a first metal magnetic particle covered with a first resin portion made of a first resin material; and a second metal magnetic particle having a smaller particle size than the first metal magnetic particle, the second metal magnetic particle being bound to the first metal magnetic particle via a second resin portion made of a second resin material, the second resin material having a softening point higher than the first resin material.

2. The composite magnetic particle according to claim 1, wherein the softening point of the second resin material is 50° C. or more higher than a softening point of the first resin material.

3. The composite magnetic particle according to claim 1, wherein an entire surface of the first metal magnetic particle is covered with the first resin portion.

4. The composite magnetic particle according to claim 1, wherein the first resin portion accounts for 0.01 wt % to 10 wt % relative to the second resin portion of 100 wt %.

5. The composite magnetic particle according to claim 4, wherein the first resin portion accounts for 0.01 wt % to 0.1 wt % relative to the second resin portion of 100 wt %.

6. A magnetic base body containing the composite magnetic particle according to claim 1.

7. An electronic component comprising the magnetic base body according to claim 6.

8. The electronic component according to claim 7, comprising a coil provided in the magnetic base body.

9. A composite magnetic particle comprising:

a first metal magnetic particle covered with a first resin portion made of a first resin material; and a second metal magnetic particle having a smaller particle size than the first metal magnetic particle, the second metal magnetic particle being bound to the first metal magnetic particle via a second resin portion made of a second resin material, wherein the first resin portion accounts for 0.01 wt % to 10 wt % relative to the second resin portion of 100 wt %.

10. The composite magnetic particle according to claim 9, wherein the first resin portion accounts for 0.01 wt % to 0.1 wt % relative to the second resin portion of 100 wt %.

11. The composite magnetic particle according to claim 9, wherein an entire surface of the first metal magnetic particle is covered with the first resin portion.

12. The composite magnetic particle according to claim 9, wherein the first resin portion has a thickness of 100 nm or less.

13. A magnetic base body containing the composite magnetic particle according to claim 9.

14. An electronic component comprising the magnetic base body according to claim 13.

15. The electronic component according to claim 14, comprising a coil provided in the magnetic base body.

* * * * *